US012116024B2

(12) United States Patent
Sharp et al.

(10) Patent No.: US 12,116,024 B2
(45) Date of Patent: Oct. 15, 2024

(54) PLATFORM LIFT FOR RAILROAD CAR MOVING VEHICLE

(71) Applicant: STEWART & STEVENSON LLC, Houston, TX (US)

(72) Inventors: Brian Sharp, Houston, TX (US); Joe Rielly, Houston, TX (US); Matthew Drummond, Houston, TX (US)

(73) Assignee: STEWART & STEVENSON LLC, Houston, TX (US)

( * ) Notice: Subject to any disclaimer, the term of this patent is extended or adjusted under 35 U.S.C. 154(b) by 368 days.

(21) Appl. No.: 17/503,658

(22) Filed: Oct. 18, 2021

(65) Prior Publication Data

US 2022/0126888 A1 Apr. 28, 2022

Related U.S. Application Data

(60) Provisional application No. 63/104,873, filed on Oct. 23, 2020.

(51) Int. Cl.

| | |
|---|---|
| ***B61J 3/12*** | (2006.01) |
| ***B61D 47/00*** | (2006.01) |
| ***B66F 7/06*** | (2006.01) |
| ***B66F 7/28*** | (2006.01) |
| *B61D 3/18* | (2006.01) |

(52) U.S. Cl.
CPC .......... *B61D 47/005* (2013.01); *B66F 7/0625* (2013.01); *B66F 7/28* (2013.01); *B61D 3/187* (2013.01)

(58) Field of Classification Search
CPC ..... B61D 47/005; B61D 3/187; B66F 7/0625; B66F 7/28; B61J 3/12
See application file for complete search history.

(56) References Cited

U.S. PATENT DOCUMENTS

| | | | | |
|---|---|---|---|---|
| 3,130,686 A * | 4/1964 | Gumprecht | B60S 9/14 105/72.2 |
| 3,804,025 A * | 4/1974 | Elliott | B60F 1/005 105/72.2 |
| 9,587,356 B2 * | 3/2017 | Noll | E01B 27/16 |
| 10,696,113 B2 * | 6/2020 | Lang | B60F 1/005 |

* cited by examiner

*Primary Examiner* — Lynn E Schwenning
*Assistant Examiner* — Lucia Elba Rodriguez
(74) *Attorney, Agent, or Firm* — Ewing & Jones, PLLC

(57) ABSTRACT

A railroad car moving vehicle comprises a chassis, the chassis including at least two ground wheels and at least two track wheels; a platform moveably mounted on the chassis; a platform lifting apparatus configured to move the platform between a raised position and a lowered position relative to the chassis, the platform lifting apparatus including a platform lifting cylinder operatively coupled between the chassis and the platform; and at least one locking leg, the locking leg positionable between an extended position and a stowed position, the locking leg preventing lowering of the platform when in the extended position.

8 Claims, 9 Drawing Sheets

PLATFORM LIFT FOR RAILROAD CAR MOVING VEHICLE

CROSS-REFERENCE TO RELATED APPLICATIONS

This application is a nonprovisional application which claims priority from U.S. provisional application No. 63/104,873, filed Oct. 23, 2020, which is hereby incorporated by reference herein in its entirety.

TECHNICAL FIELD/FIELD OF THE DISCLOSURE

The present disclosure relates generally to vehicles and more specifically to vehicles with in which a platform is movable relative to a chassis.

BACKGROUND OF THE DISCLOSURE

Railroad car moving vehicles are used for moving railroad cars without the need for locomotives. Such vehicles are capable of operating both on the railroad track for the moving of railroad cars or on the ground for moving the railroad car moving vehicle between railroad tracks. Such a vehicle is sometimes referred to as a rubber-rail car. When the railroad car moving vehicle is operated on the railroad track, the rubber-tired ground wheels are retracted to a position above the rails on each side of the vehicle. When the track wheels are no longer required, the ground wheels are lowered and locked in place so that the vehicle can travel over the ground.

SUMMARY

The present disclosure provides for a platform lifting apparatus. The platform lifting apparatus may include a platform lifting cylinder operatively coupled between a chassis and a platform. The platform lifting apparatus may include a locking leg positionable between an extended position and a stowed position, the locking leg preventing lowering of the platform when in the extended position.

The present disclosure also provides for a railroad car moving vehicle. The railroad car moving vehicle may include a chassis, a platform, and a platform lifting apparatus. The platform lifting apparatus may include a platform lifting cylinder operatively coupled between the chassis and the platform. The platform lifting apparatus may include a locking leg positionable between an extended position and a stowed position, the locking leg preventing lowering of the platform when in the extended position.

The present disclosure also provides for a method. The method may include providing a platform of a railroad car moving vehicle and a chassis of a railroad car moving vehicle. The method may include mechanically coupling the platform to the chassis by a platform lifting cylinder. The method may include extending the platform lifting cylinder to move the platform from a lowered to a raised position, moving a locking leg from a stowed position to an extended position, and maintaining the platform in the raised position.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
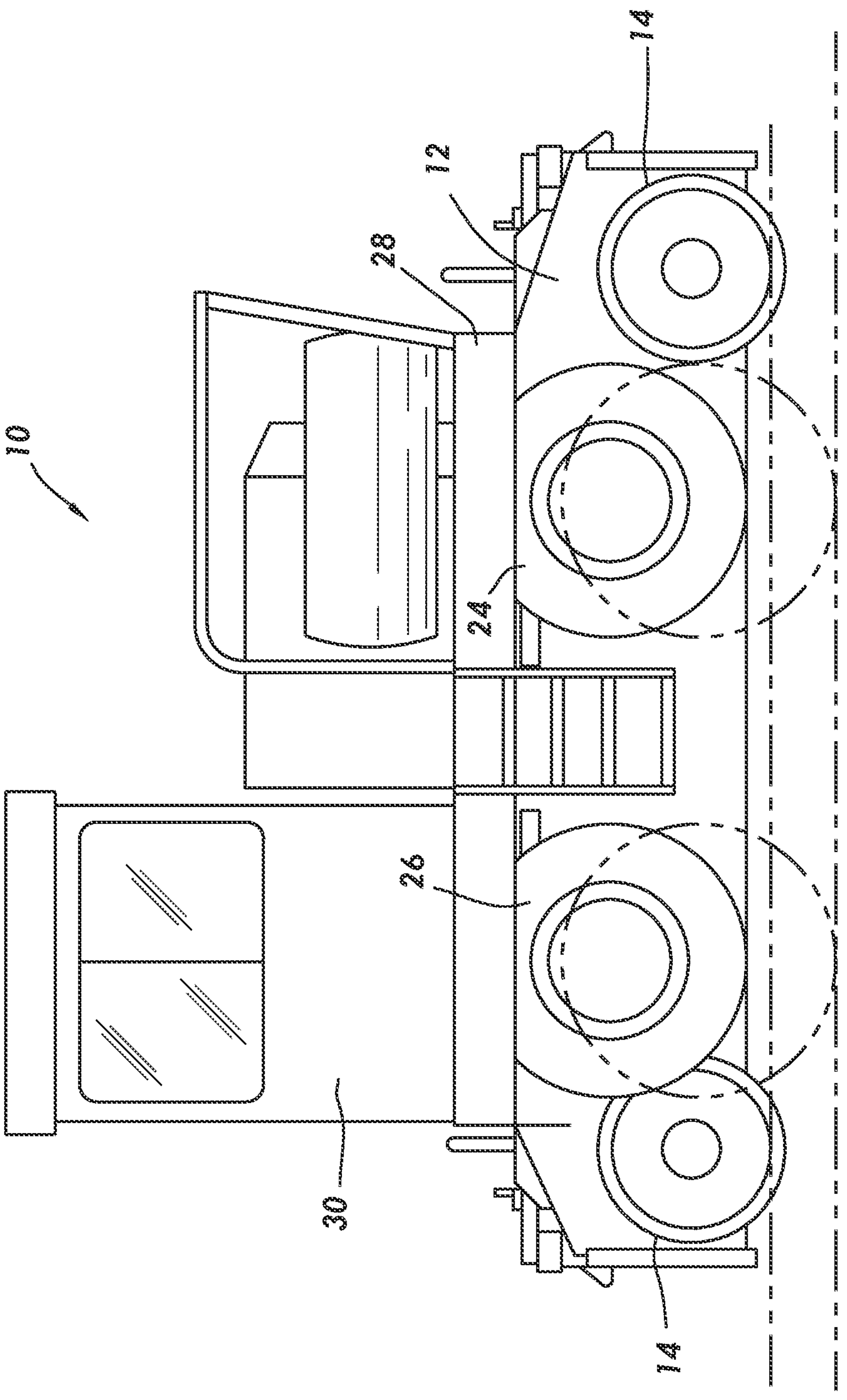
FIG. 1 is a side view of a railroad car moving vehicle consistent with at least one embodiment of the present disclosure.
Figure 2:
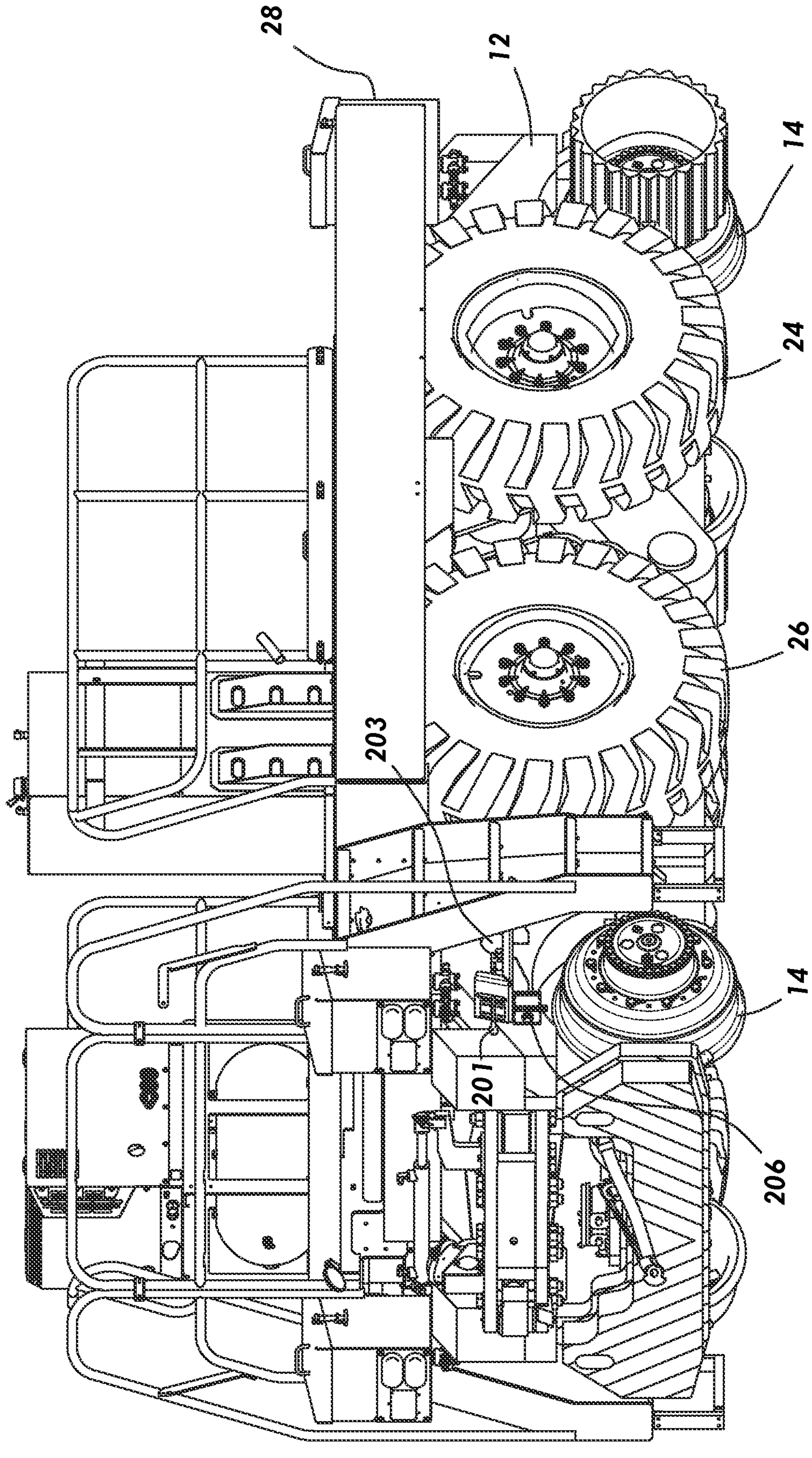
FIG. 2 is a perspective view of a railroad car moving vehicle consistent with at least one embodiment of the present disclosure with platform in a lowered position.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts a side view of railroad car moving vehicle 10 consistent with at least one embodiment of the present disclosure. Railroad car moving vehicle 10 may include chassis 12 and platform 28. In some embodiments, flanged rail wheels 14 may be mechanically coupled to chassis 12 for use when railroad car moving vehicle 10 is operated on a railroad track. In some embodiments, ground wheel sets 24 and 26 may be coupled to chassis 12 for use when railroad car moving vehicle 10 is operated on the ground. Ground wheel sets 24, 26 may include pneumatic rubber tires or foam filled tires which may be raised and lowered hydraulically by hydraulic cylinders mounted on chassis 12. In some embodiments, cab 30 and other equipment may be positioned on platform 28.

Figure 3:
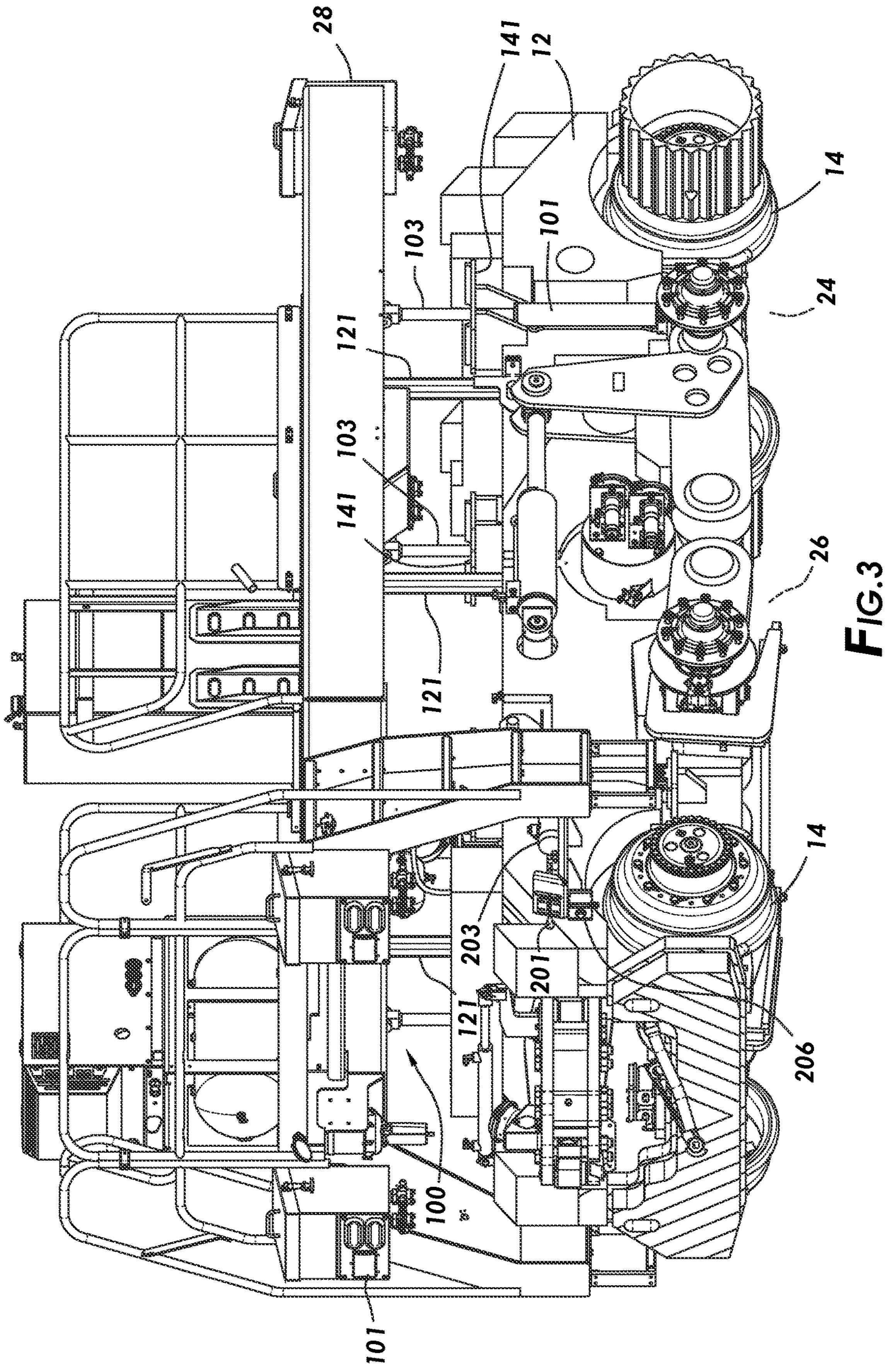
FIG. 3 is a perspective view of the railroad car moving vehicle of FIG. 2 in a raised position.
Figure 4:
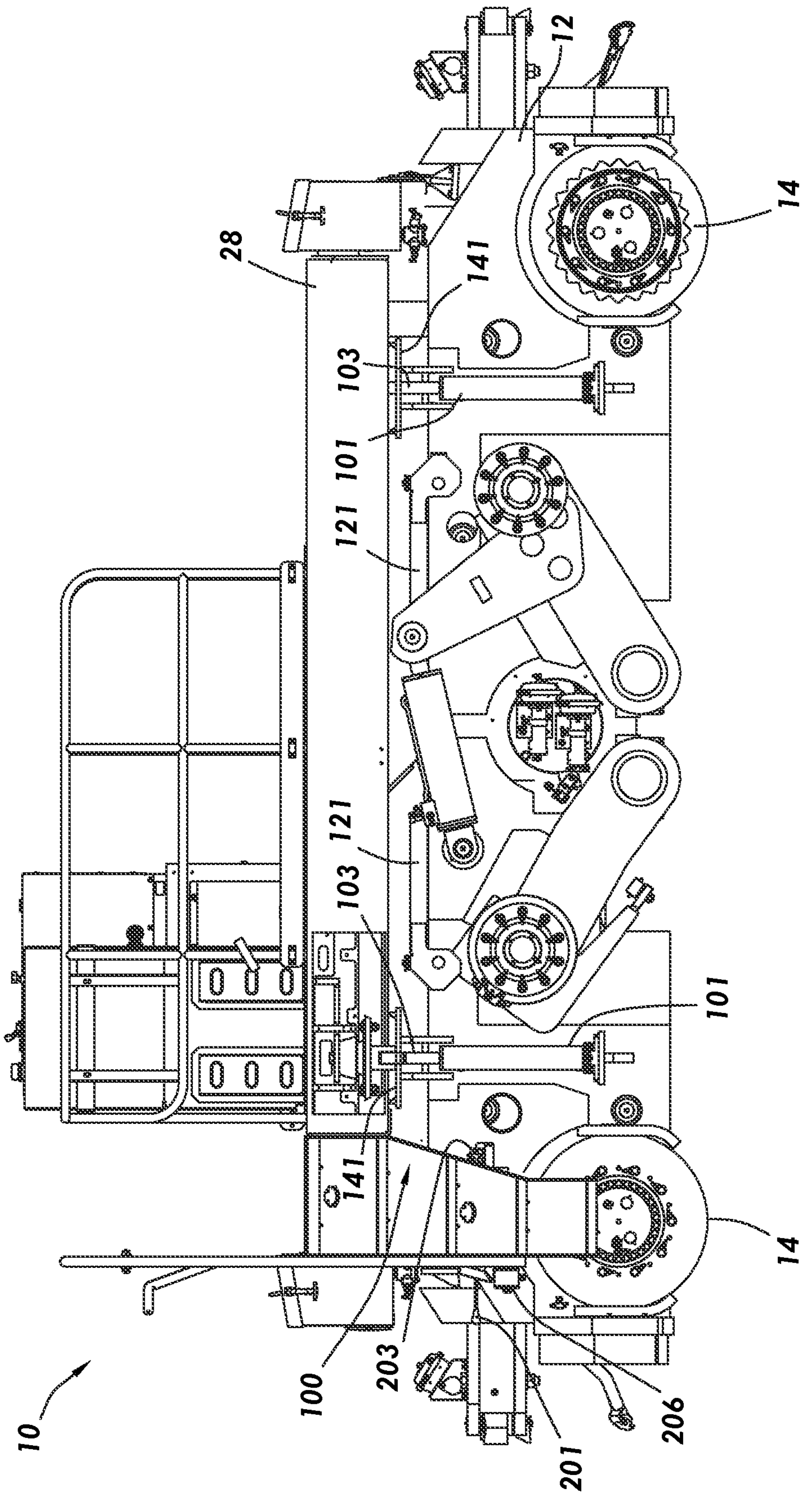
FIG. 4 is a side view of the railroad car moving vehicle of FIG. 2 in a lowered position.
Figure 5:
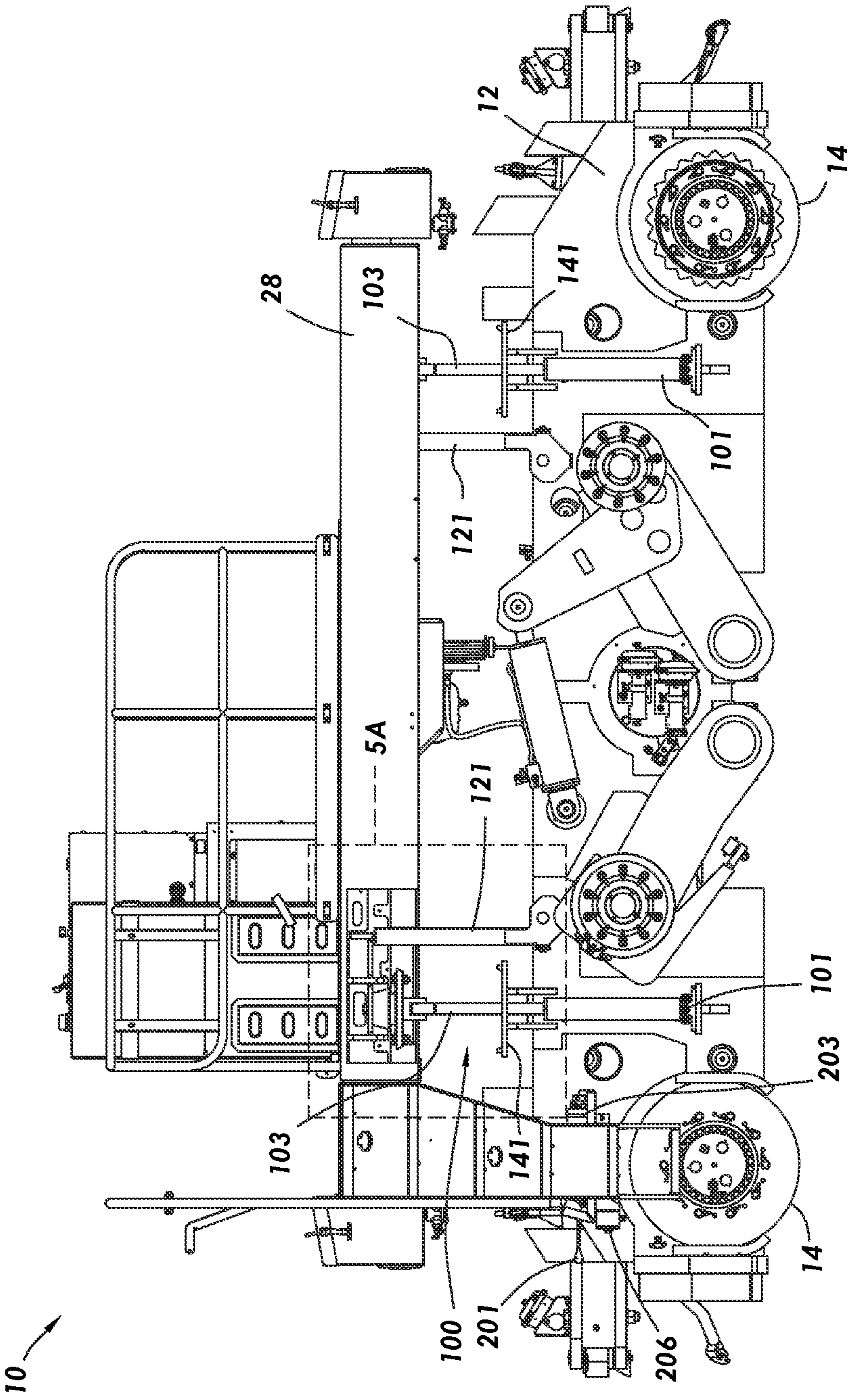
FIG. 5 is a side view of the railroad car moving vehicle of FIG. 2 in the raised position.

In some embodiments, platform 28 may be coupled to chassis 12 by platform lifting apparatus 100 as shown in FIGS. 2-7. In some embodiments, platform lifting apparatus 100 may include platform lift cylinders 101. Platform lift cylinders 101 may be mechanically coupled between chassis 12 and platform 28 such that extension of pistons 103 cause platform 28 to be moved between a lowered position (FIGS. 2 & 4) and a raised position (FIGS. 3 & 5). In the raised position, platform 28 is higher than in the lowered position. In some embodiments, platform lift cylinders 101 may be hydraulically or pneumatically actuated. In some embodiments, platform lift cylinders 101 may be electrically actuated.

In some embodiments, platform lifting apparatus 100 may be configured such that the raised position is at least 18"

higher than the lowered position. Thus, when platform 28 is in the raised position there is at least 18" of vertical space between the bottom of platform 28 and the equipment below platform 28. The vertical clearance may be sufficient to allow maintenance access to the equipment below platform 28 without requiring personnel to be beneath the equipment and without requiring removal of platform 28 from chassis 12.

Figure 6:
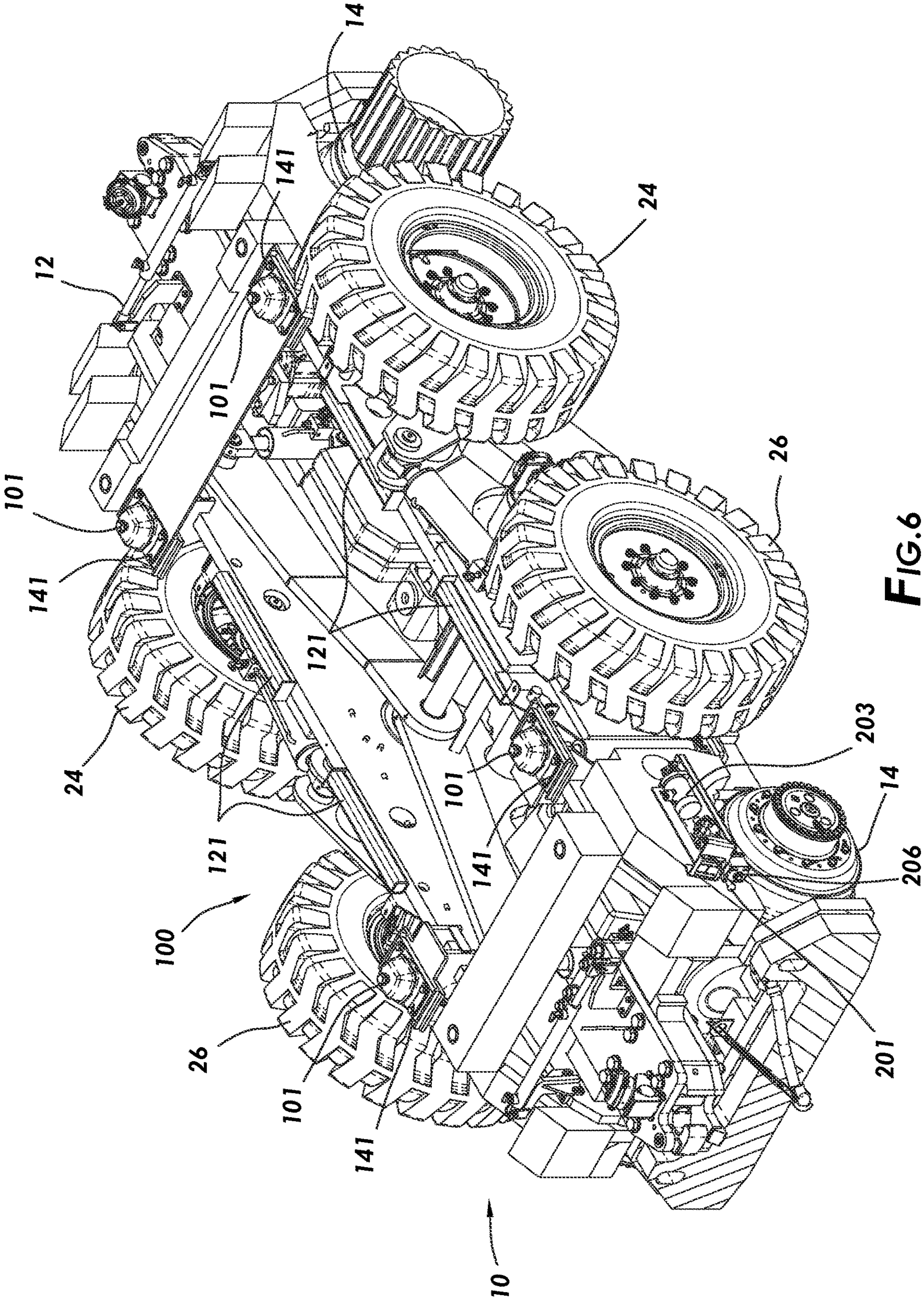
FIG. 6 is a perspective view of a chassis of a railroad car moving vehicle consistent with at least one embodiment of the present disclosure.
Figure 7:
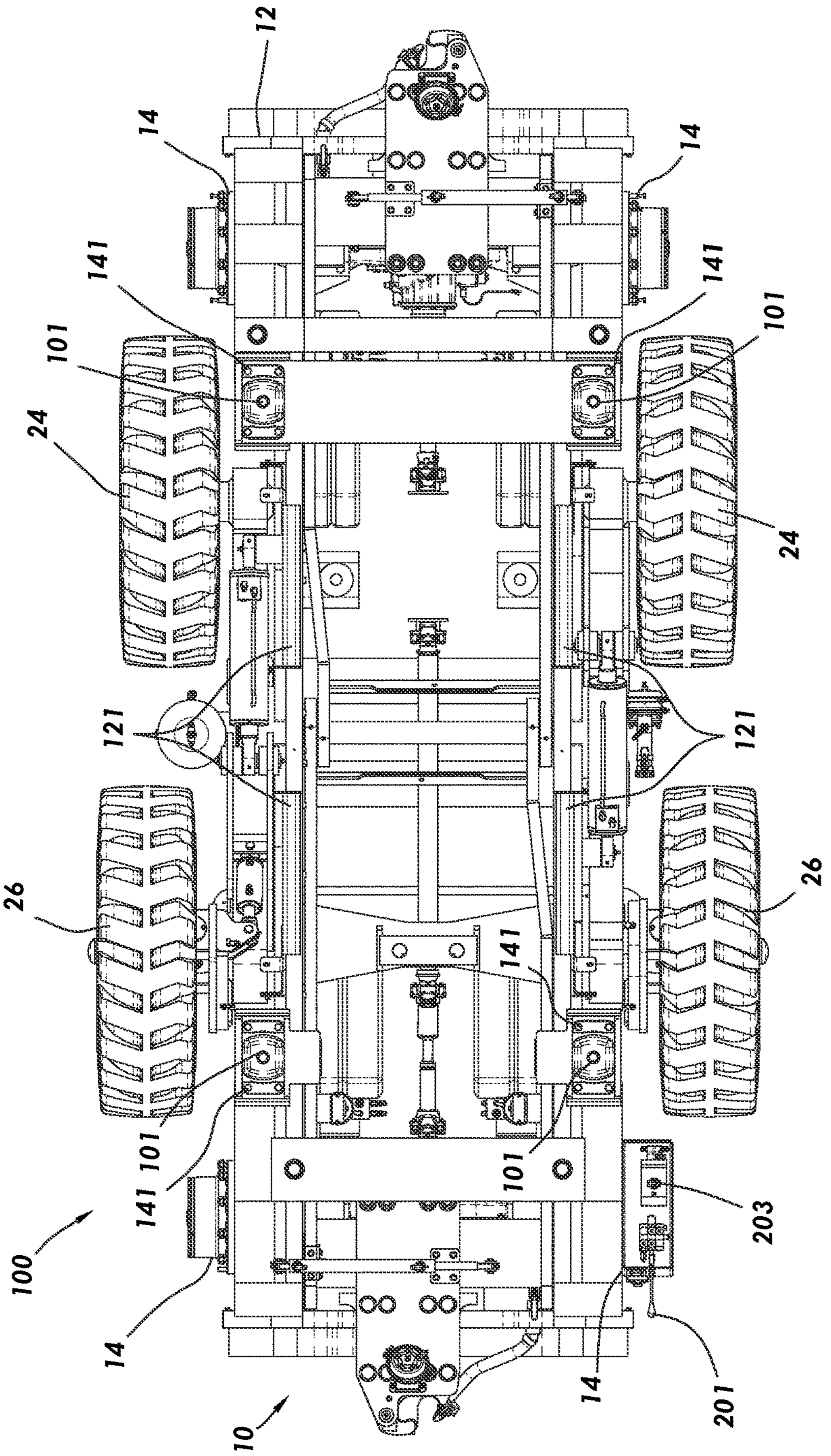
FIG. 7 is a top view of the chassis of FIG. 6.

In some embodiments, platform lifting apparatus 100 may include four platform lift cylinders 101 arranged in a rectangular pattern about chassis 12, as shown in FIGS. 6, 7.

Figure 8:
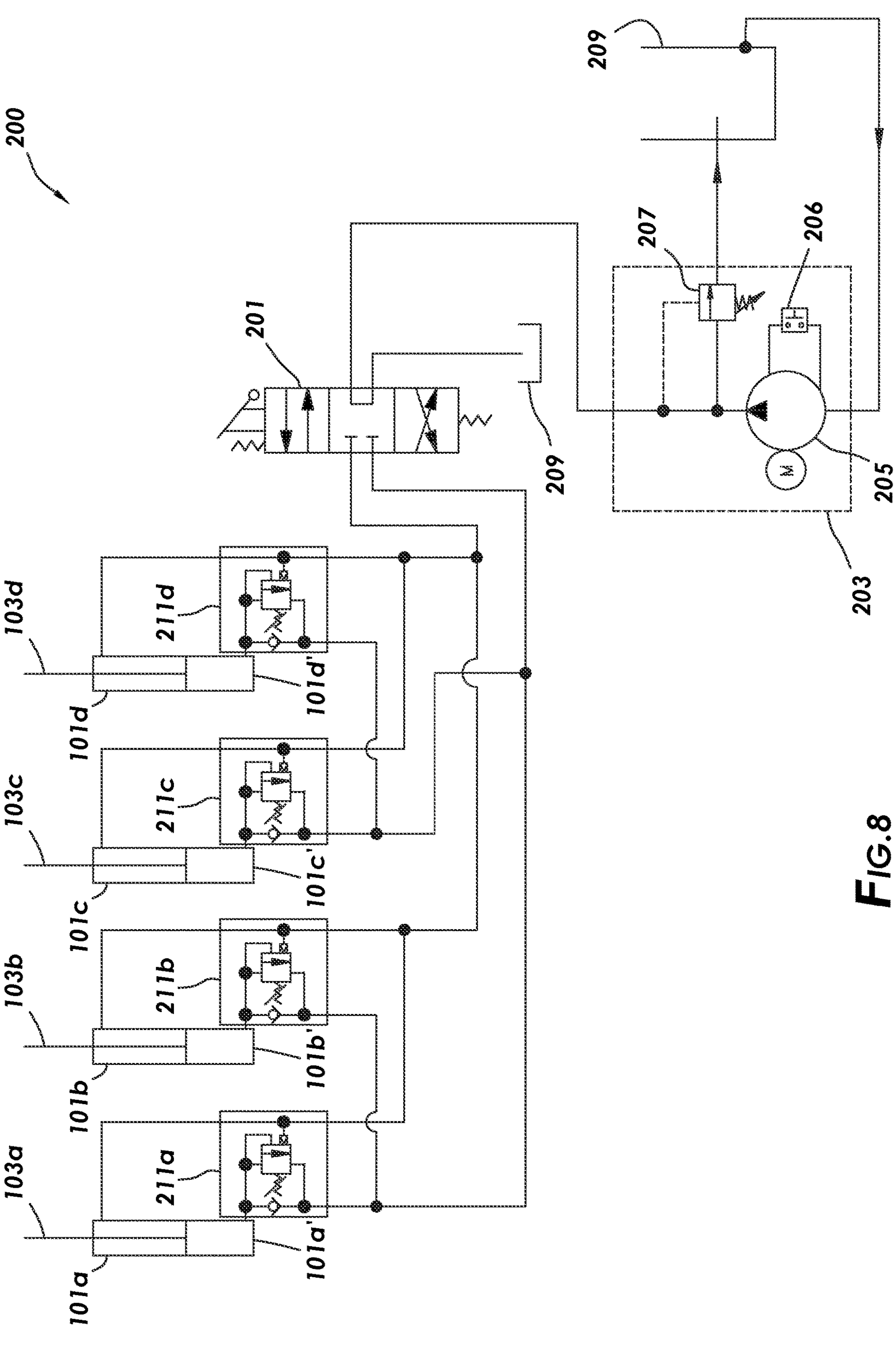
FIG. 8 is a schematic view of a hydraulic system of a railroad car moving vehicle consistent with at least one embodiment of the present disclosure.

FIG. 8 depicts a schematic view of hydraulic system 200 of platform lifting apparatus 100 consistent with at least one embodiment of the present disclosure. As shown in FIG. 8, platform lift cylinders 101*a-d* may be controlled by operation of directional control valve 201. Directional control valve 201 may be supplied with hydraulic fluid by hydraulic pump assembly 203. Hydraulic pump assembly 203 may include hydraulic pump 205 and relief valve 207. Hydraulic fluid may be supplied to hydraulic pump 205 from reservoir 209.

In some embodiments, platform lifting apparatus 100 may include pump on/off control 206. Pump on/off control 206 may, in some embodiments, be operatively coupled to hydraulic pump 205 such that activation of pump on/off control 206 by an operator is necessary for hydraulic pump 205 to operate. In some embodiments, pump on/off control 206 may be an electric switch operatively coupled to the power supply or control system of hydraulic pump 205. In some embodiments, pump on/off control 206 may be a momentary, normally open switch such that continuous activation of pump on/off control 206 may be necessary for the operation of hydraulic system 200.

In some embodiments, hydraulic system 200 may include one or more counterbalance valves 211*a-d*. In some embodiments, each platform lift cylinder 101*a-d* may include a corresponding counterbalance valve 211*a-d*. In some such embodiments, each counterbalance valve 211*a-d* may be coupled to cap end port 101*a*'-d' such that counterbalance valves 211*a-d* hold pistons 103*a-d* in the extended position until retraction is commanded by directional control valve 201. In such an embodiment, platform 28 may be held in the raised position against gravity by counterbalance valves 211*a-d* without requiring continuous hydraulic fluid supply by hydraulic pump 205 and while allowing directional control valve 201 to return to the neutral position.

Figure 5A:
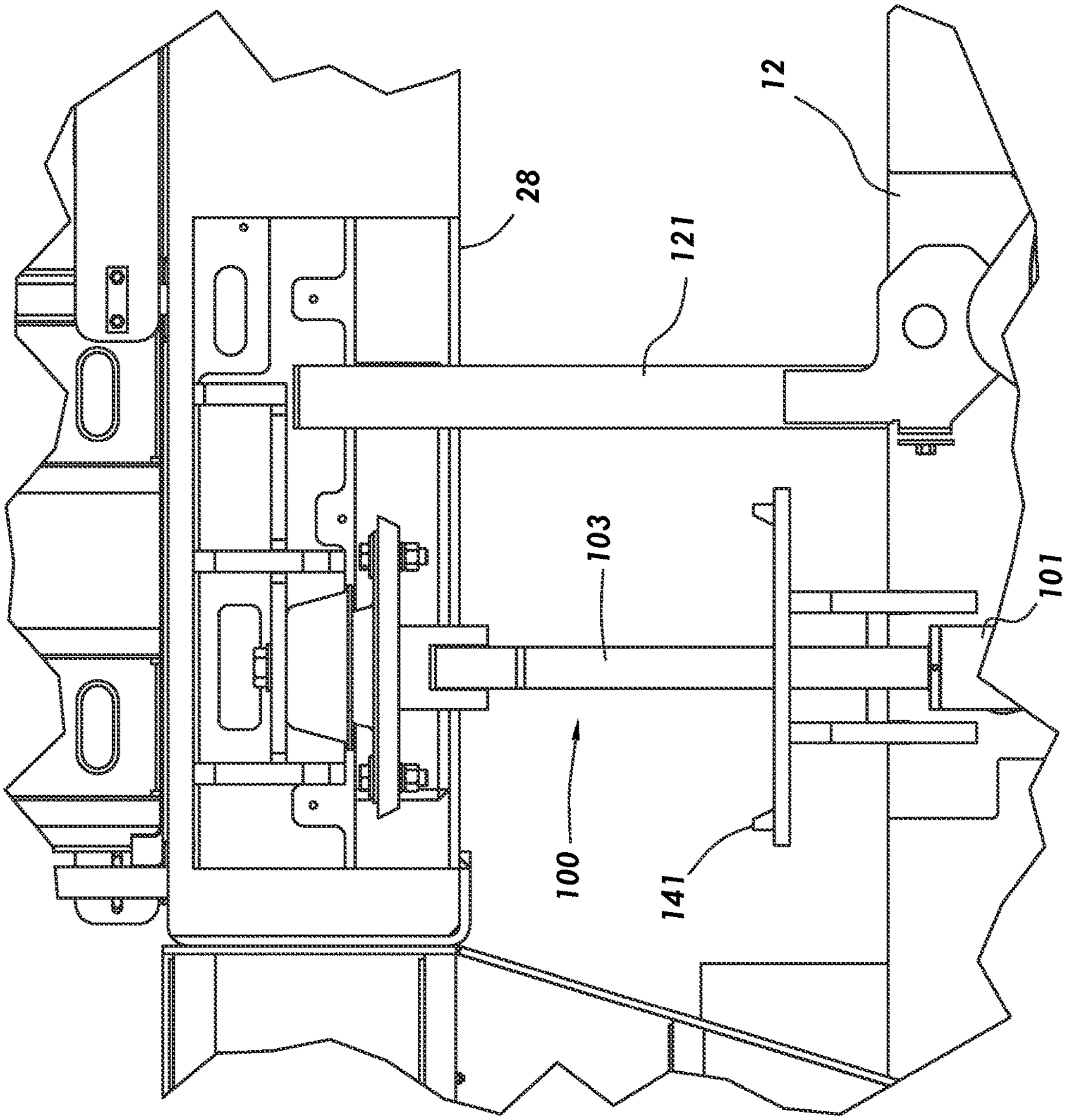
FIG. 5A is a detail view of the railroad car moving vehicle of FIG. 5.

In some embodiments, as shown in FIGS. 2-7, platform lifting apparatus 100 may include one or more locking legs 121. Locking legs 121 may be retractably coupled to chassis 12 or, in other embodiments, to platform 28. In some embodiments, locking legs 121 may be pivotable between a stowed position such as is shown in FIGS. 2, 4, 6, and 7, and an extended position as shown in FIGS. 3, 5, and 5A. When in the extended position, locking legs 121 may be positioned such that the ability of platform 28 to return to the lowered position is impeded by locking legs 121. In some embodiments, when in the retracted position, locking legs 121 may be positioned such that lowering of platform 28 is not impeded.

Locking legs 121 may be manually pivotable. In some embodiments, platform lifting apparatus 100 may include at least two locking legs 121. Each locking leg 121 may be separately operable. In some embodiments, two or more locking legs 121 may be electronically or mechanically coupled such that movement of one locking leg 121 causes a corresponding movement of the locking leg(s) 121 that are coupled to it. Thus, by way of example, in a system with four locking legs, manual rotation of a locking leg on one side of platform 28 into the extended position may cause the locking leg on the opposite side of platform 28 to also pivot into the extended position, thus allowing all four locking legs 121 to be pivoted into the extended position by an operator on one side of the chassis.

In some embodiments, platform lifting apparatus 100 may include an electronic safety lockout system coupled between locking legs 121 and pump on/off control 206. The safety lockout system may be configured such once locking legs 121 have been moved into the extended position and subsequently moved into the stowed position, hydraulic lowering of platform 28 is prevented until the safety lockout system is manually re-set.

In some embodiments, with reference to FIGS. 4, 5, 5A, 6, and 7, platform lifting apparatus 100 may include mechanical stops 141. Mechanical stops 141 may, in some embodiments, provide surfaces against which platform 28 rests when in the lowered position. Mechanical stops 141 may be mechanically coupled to chassis 12.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:

a) providing a railroad car moving vehicle comprising:

a chassis, the chassis including at least two ground wheels and at least two track wheels;

a platform moveably mounted on the chassis;

a platform lifting apparatus configured to move the platform between a raised position and a lowered position relative to the chassis wherein the platform lifting apparatus includes a hydraulic cylinder and wherein the platform lifting apparatus further includes a hydraulic system, the hydraulic system including a pump, reservoir, directional control valve, and counterbalance valve and wherein the platform lifting apparatus further includes a pump on/off control operably controlling the hydraulic system, and wherein the platform lifting apparatus further includes an electronic safety lockout system coupled between at least one locking leg and the pump on/off control, wherein the safety lockout system is configured such once a locking leg has been moved into the extended position and subsequently moved into the stowed position, lowering of the platform is prevented until the safety lockout system is manually re-set and wherein the pump on/off control comprises a normally open switch such that continuous activation of pump on/off control is required for the operation of the hydraulic system; and at least one locking leg, the locking leg positionable between an extended position and a stowed position, the locking leg preventing lowering of the platform when in the extended position;

b) extending the platform lifting cylinder to move the platform from a lowered to a raised position;

c) moving a locking leg from a stowed position to an extended position; and d) maintaining the platform in the raised position.

2. The method of claim 1, further comprising the steps of:

e) moving the locking leg from the extended to the stowed position; and f) moving the platform from a raised to a lowered position.

3. The method of claim 2 wherein the chassis further includes one or more mechanical stops configured such that the platform abuts the mechanical stops when in the lowered position, and wherein step f) engaging mechanical stop with the platform.

4. The method of claim 1 wherein the locking leg is pivotably coupled to the chassis.

5. A method comprising:

a) providing a railroad car moving vehicle comprising:

a chassis, the chassis including at least two ground wheels and at least two track wheels;

a platform moveably mounted on the chassis;

a platform lifting apparatus configured to move the platform between a raised position and a lowered position relative to the chassis wherein the platform lifting apparatus includes a hydraulic cylinder and wherein the platform lifting apparatus further includes a hydraulic system, the hydraulic system including a pump, reservoir, directional control valve, and counterbalance valve and wherein the platform lifting apparatus further includes a pump on/off control operably controlling the hydraulic system, and wherein the pump on/off control comprises normally open switch such that continuous activation of pump on/off control is required for the operation of the hydraulic system, and an electronic safety lockout system coupled between at least one locking leg and the pump on/off control, wherein the safety lockout system is configured such once a locking leg has been moved into the extended position and subsequently moved into the stowed position, lowering of the platform is prevented until the safety lockout system is manually re-set; and at least one locking leg, the locking leg positionable between an extended position and a stowed position, the locking leg preventing lowering of the platform when in the extended position;

b) extending the platform lifting cylinder to move the platform from a lowered to a raised position;

c) moving a locking leg from a stowed position to an extended position; and d) maintaining the platform in the raised position.

6. The method of claim 5, further comprising the steps of:

e) moving the locking leg from the extended to the stowed position; and f) moving the platform from a raised to a lowered position.

7. The method of claim 6 wherein the chassis further includes one or more mechanical stops configured such that the platform abuts the mechanical stops when in the lowered position, and wherein step f) engaging mechanical stop with the platform.

8. The method of claim 5 wherein the locking leg is pivotably coupled to the chassis.

* * * * *